United States Patent [19]

Presto

[11] 4,306,381
[45] Dec. 22, 1981

[54] PLASTIC DOOR FOR AN AUTOMOBILE

[75] Inventor: Douglas A. Presto, Bensalem, Pa.

[73] Assignee: The Budd Company, Troy, Mich.

[21] Appl. No.: 120,727

[22] Filed: Feb. 11, 1980

[51] Int. Cl.³ .............................................. B60J 5/04
[52] U.S. Cl. ..................................................... 49/502
[58] Field of Search ................................. 49/502, 348

[56] References Cited

U.S. PATENT DOCUMENTS 2,650,857 9/1953 Watter et al. ........................ 49/502
3,370,384 2/1968 Hafer et al. .......................... 49/502
3,782,036 1/1974 Clark et al. .......................... 49/502

Primary Examiner—Kenneth Downey
Attorney, Agent, or Firm—A. L. Trueax, Jr.

[57] ABSTRACT

A plastic door comprises inner and outer sub-assemblies. The inner sub-assembly includes the inner trim, panel, hardware mounting panel, window mechanism and other hardware which may be manufactured off line and attached to the outer sub-assembly as one of the final steps in the manufacture of the automobile on an assembly line.

8 Claims, 4 Drawing Figures

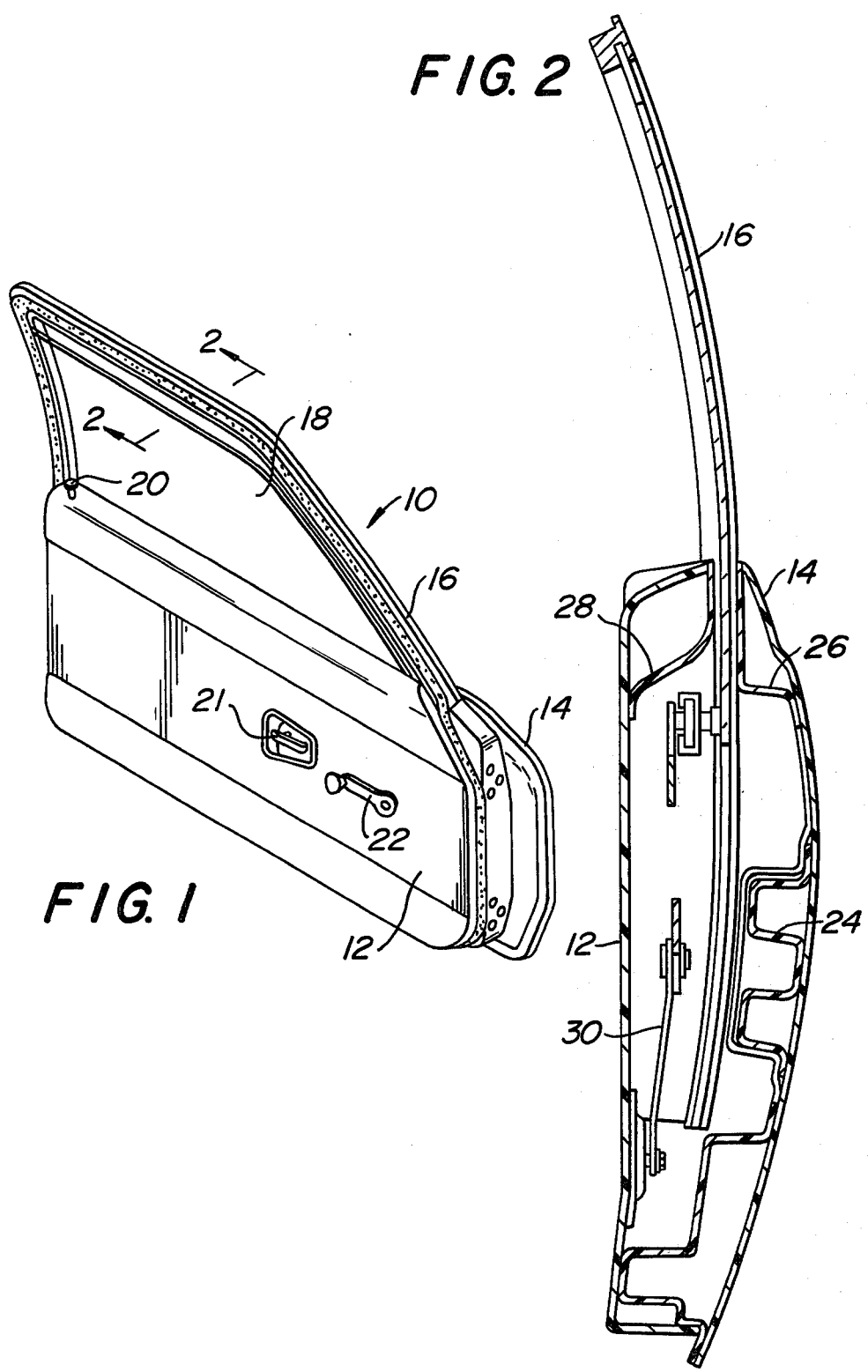

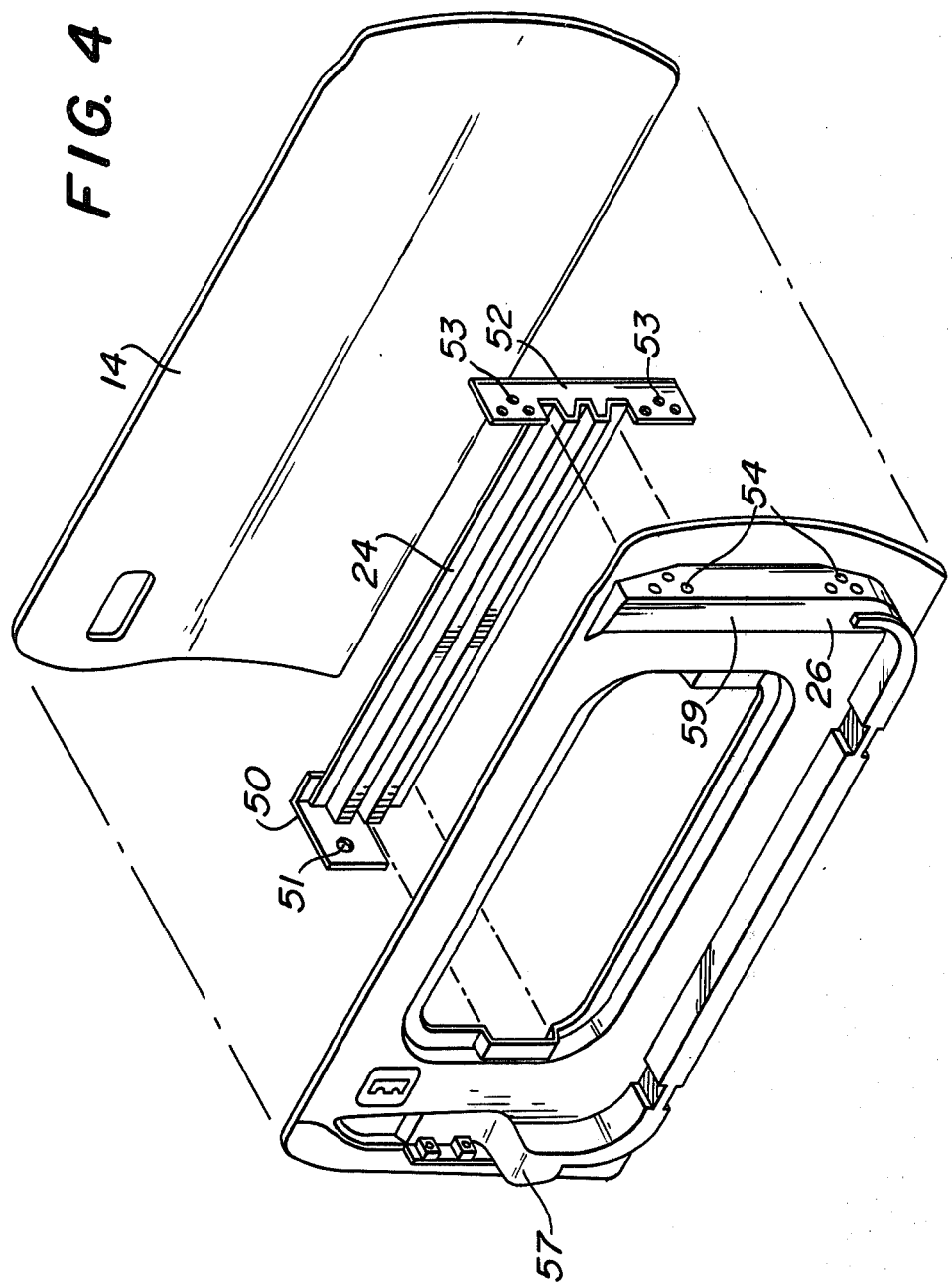

PLASTIC DOOR FOR AN AUTOMOBILE

BACKGROUND OF THE INVENTION

While plastic doors for automobiles have been used, one of the problems involved is that they often are not sufficiently strong to meet Federal standards. Another problem has been that such plastic doors are often not capable of providing means for receiving fittings and various hardware. In cases where the doors have been made capable to receive such fittings and hardware, the doors were completely sealed making it very difficult to service especially with respect to the installed window and window mechanism.

In assembling an automobile on a production line, much time is spent on the construction of the door. Generally, parts such as the handle, window and window mechanisms are put on at different stations. The final trim for the interior of the door generally takes considerable time and is done towards the end of the production line. The installation of such trim and hardware items often take more than one station and tends to slow down the assembly line.

OBJECTS OF THE INVENTION

It is an object of this invention to provide an improved plastic door of increased strength for an automobile.

It is a further object of this invention to provide an improved plastic door capable of receiving standard fittings and hardware.

It is still a further object of this invention to provide an improved plastic door wherein the parts within the door are readily serviceable after assembly.

It is still a further object of this invention to provide an improved automobile door wherein the trim, window mechanism and other hardware may be assembled off line and installed as a unit onto an automobile coming off an assembly line.

SUMMARY OF THE INVENTION

In accordance with the present invention, a plastic door for an automobile comprises inner and outer panels built as separate sub-assemblies. The outer panel sub-assembly includes a panel with a reinforcement beam attached thereto. The inner panel sub-assembly includes a hardware mounting panel secured to the main panel. A window mechanism is attached to the mounting panel. The inner panel sub-assembly, including the interior trim, may be done off line and attached to the outer panel subassembly as one of the final steps in the assembly of the automobile.

Other objects and advantages of the present invention will be apparent and suggest themselves to those skilled in the art, from a reading of the following specification and claims, taken in conjunction with the accompanying drawings, in which:

BRIEF DESCRIPTION OF THE DRAWINGS

FIG. 1 is an isometric view of a plastic door for an automobile, in accordance with the present invention;

FIG. 2 is a cross-sectional view taken along lines 2—2 of FIG. 1;

FIG. 4 is an exploded view illustrating the outer panel sub-assembly, in accordance with the present invention.

DETAILED DESCRIPTION OF THE PREFERRED EMBODIMENTS

Figure 3:
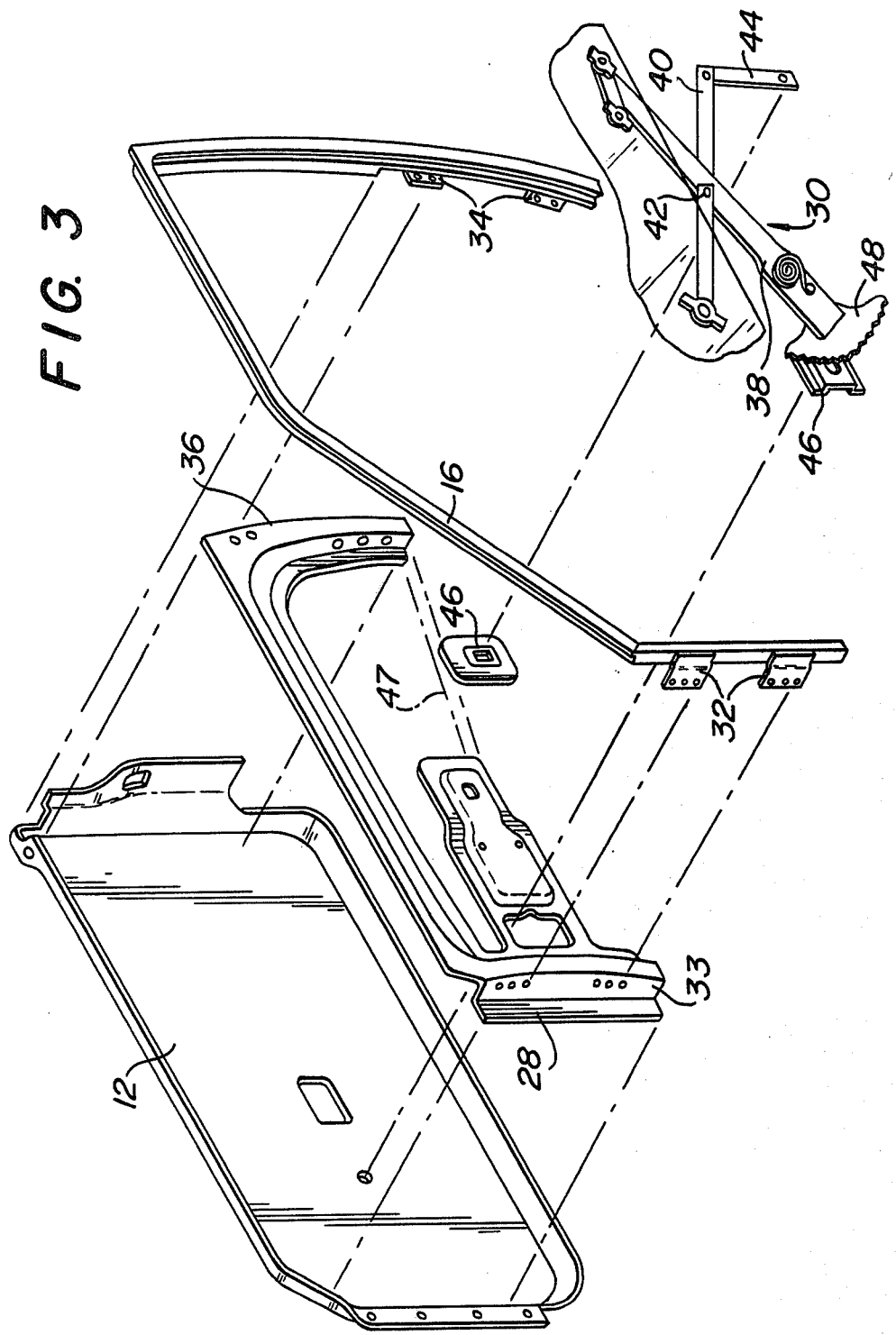
FIG. 3 is an exploded view illustrating the inner panel sub-assembly, in accordance with the present invention.

Referring particularly to FIG. 1, a plastic door 10 comprises an inner panel 12 and an outer panel 14. A window frame 16 including a window 18 is disposed between the inner and outer panels.

The exterior of the door 10 is somewhat conventional in appearance. It may include a locking mechanism 20 for the window 18, a handle 21 to open and close a latch, and a handle 22 to move the window 18 up or down.

In the present invention, the inner and outer panels 12 and 14 are built as separate sub-assemblies so that they may be made independently of each other. The inner panel 12 is designed to receive the hardware, such as the lock 20, handle 21, handle 22 and window 18 with its associated mechanism. The outer sub-assembly including the panel 14 may include the reinforcements for the door and adapted to receive the inner sub-assembly as part of the final operation of the door on an assembly line.

Referring to FIG. 2, the outer sub-assembly includes the outer panel 14 with a door beam 24 being secured thereto by adhesive or any outer suitable means. The beam 24 may be metal or glass reinforced fiber so as to give strength to the door especially in the event of side impacts. A halo panel 26 surrounds the beam 24 and includes various means for attachment of the inner panel assembly thereto.

The inner panel sub-assembly includes the inner panel 12 and a hardware mounting panel 28 secured thereto. The window frame 16 is secured to the hardware mounting panel 28. A window mechanism 30 is secured to the hardware mounting panel 28 and connected to move the window 18 up and down.

During the assembly of the automobile, the outer panel subassembly including the outer panel 14, the beam 24 and the halo panel 26 may be separately assembled along with the other parts of the car. As one of the final operations in the asembly of the door of the automobile, the inner panel sub-assembly including an inner panel 12, the hardware mounting panel 28 and window frame 16, along with various hardware including the window 18 and the window mechanism 30 may be assembled as a separate unit.

The entire inner panel assembly is then attached to the outer panel sub-assembly as one of the final steps in the assembly of the automobile. The inner panel subassembly may include various trim for the interior of the car. While some hardware has been illustrated, it is apparent that the inner panel sub-assembly may be adapted to receive various additional hardware including, for example, loud speakers for a radio, ashtrays and the like.

Referring particularly to FIG. 3, the main parts for the inner subassembly are illustrated. The inner sub-assembly includes the inner panel 12, the window frame 16, the hardware mounting panel 28 along with various hardware items including the window mechanism 30. The window frame 16 is secured to the hardware mounting panel 28 by means of mounting plate 32 having openings therein to permit attachment to the end 33 of the hardware mounting panel 28 which also includes apertures in alignment with the apertures upon the mounting plate 32. Suitable screws (not illustrated) are inserted through the openings in the mounting plates 32 and 33 to provide mounting of the pieces. In like manner, mounting plates 34 are adapted to be connected to the end 36 of the mounting panel 28 by means of screws or nuts or bolts (not illustrated) which extend through suitable openings in the plates 34 and openings in the end 36 of the mounting panel 28.

The window mechanism 30 may be conventional in design with a pair of pivot arms 38 and 40 pivoted about a point 42. An arm 44 is secured to hardware mounting panel 28 at mounting point 46. The pivot point 46 may be a molded piece molded when the hardware mounting panel 28 is molded so that it will be accurately positioned. When the panel 28 is secured to the inner panel 12, a section of plastic 47 is removed from between the main mounting panel portion and element including the pivot point 46. The ends of the lever arms 38 and 40 are connected to move the window 18 up and down. The handle 22 (FIG. 1) is connected to a bracket 46 to drive a gearing member 48. Rotation of the handle 22 causes the movement of the gear member 48 to actuate the window mechanism to move the window 18 up or down in a conventional manner.

The hardware mounting panel 28 is secured within the frame of the inner panel 12. The mounting panel 28 may be secured to the panel 12 by adhesive or any other suitable means. The entire assembly illustrated in FIG. 3 may be made off line from the main automobile including the outer door sub-assembly, which could be installed in the car as one of the assembly steps. The assembly of FIG. 3 may include various trim and other hardware items secured to the inner panel 12. The entire sub-assembly illustrated in FIG. 3 is adapted to be fitted to the outer panel assembly as part of the final operation in the assembly of the automobile.

Referring to FIG. 4, the three main parts of the outer sub-assembly include the outer panel 14, the reinforcement door beam 24 and the halo panel 26. The door beam 24 is secured to the outer panel 14 by means of adhesive or other means. The door beam 24 includes a pair of steel end connections 50 and 52. These connections extend into protruding end portions 57 and 59 of the halo panel 26. The steel end connections 50 and 52 are required for additional strength to permit the hinges of the door to be connected through suitable openings 54 at one end of the halo panel 26 and through openings 53 in the connection 52. Suitable screws may be used to provide the final attachment. The other end of the halo panel 26 receives the connection 50 with an aperture 51 for attachment thereto. The latch of the door is attached to the connection 50 through an opening at the other end of the halo panel 26 and opening 51.

All the parts illustrated in FIG. 4 may be as an off line sub-assembled unit and installed in the car at the final station in the assembly line. The final step involves insertion of the inner panel assembly onto the outer panel assembly. This operation involves securing the inner door assembly over the halo panel 26. The attachment may be made by means of nuts or bolts or in some cases may be done by means of adhesive.

It is noted that the halo panel 26 may be molded as a single piece and may include various protrusions and shapes necessary to receive any type of inner panel with its attached hardware. In like manner, the outer panel 14 may be made as a single piece in a conventional plastic mold. With respect to the inner panel, the panel 12 is a single piece and may be formed by means of a conventional molding process. The hardware mounting panel 28 may also be molded conventionally and made in a variety of shapes and includes various extensions to receive any desired hardware thereon.

The window frame 16 is made of metal and adds to the overall strength of the door.

It is noted that one of the main features of the present invention is that in effect it involves two subassemblies which may be readily separated. Thus by removing a few nuts or screws, the entire inside panel sub-assembly of the door may be removed, making the window and other hardware easily available and serviceable. In addition to the hardware illustrated, the interior of the door between the panels may include various power units including speakers and wires for power windows.

What is claimed is:

1. A plastic door for an automobile comprising:
   (a) an outer and inner sub-assembly,
   (b) said inner sub-assembly including an inner panel, a mounting panel and a window frame;
   (c) a window disposed in said window frame;
   (d) means pivotally mounted to said mounting panel and connected to selectively move said window up or down;
   (e) means for securing together said inner panel, mounting panel and window frame to form said inner sub-assembly;
   (f) said outer sub-assembly including an outer panel, a reinforcement panel and a door beam having end connections at each end thereof including apertures therein; said reinforcement panel including a halo panel having a central opening and concave configuration at opposing edges of said opening for receiving and nesting said door beam therein and protruding end portions having mating apertures therein for receiving said end connections of said door beam for mounting thereto by means connecting through said mating apertures;
   (g) means for securing together said outer panel, reinforcement panel and door beam to form said outer sub-assembly; and
   (h) means for attaching said inner sub-assembly to said outer sub-assembly to form said door for said automobile.

2. A plastic door as set forth in claim 1 wherein mounting means are provided on said outer panel sub-assembly and said inner sub-assembly to receive hinges connected to said automobile and a latch mechanism.

3. A plastic door as set forth in claim 2 wherein said mounting means comprises a pair of mounting plates secured to the ends of said door beam to receive connecting elements to connect said hinges and said latch through said reinforcement panel to said mounting plates.

4. A plastic door as set forth in claim 3 wherein said window frame is secured to said mounting panel between said mounting panel and said reinforcement panel when said inner and outer sub-assemblies are attached to each other.

5. A plastic door as set forth in claim 4 wherein said inner and outer panels comprise molded integral plastic pieces.

6. A plastic door as set forth in claim 5 wherein said mounting panel and said halo panel comprise molded integral plastic pieces.

7. A plastic door as set forth in claim 6 wherein said window frame comprises metal to provide overall strength to said door.

8. A plastic door as set forth in claim 7 wherein means including hinge connections are provided to attach said inner panel assembly to said outer panel assembly after said outer panel assembly has been mounted to said automobile as the final assembly operation of said automobile on a production line.

* * * * *